United States Patent [19]

Beaussant

[11] Patent Number: 5,272,422
[45] Date of Patent: Dec. 21, 1993

[54] HEAD EQUIPMENT WITH ARTICULATED ARM

[75] Inventor: Raymond Beaussant, Bretigny, France

[73] Assignee: Intertechnique, Plaisir, France

[21] Appl. No.: 834,878

[22] Filed: Feb. 12, 1992

[30] Foreign Application Priority Data

Feb. 12, 1991 [FR] France .................. 91 01610

[51] Int. Cl.⁵ ............................. B64D 25/00
[52] U.S. Cl. ........................ 318/3; 318/558; 244/122 A; 244/122 AB; 2/6.2
[58] Field of Search ............... 2/6, 410, 411; 33/262; 244/122 AG, 122 AB, 118.5, 119, 121, 122 R, 122 A, 122 AE, 122 AH; 318/3, 558; 244/118.5, 119, 121, 122 R, 122 A, 122 AE, 122 AH

[56] References Cited

U.S. PATENT DOCUMENTS

| | | | |
|---|---|---|---|
| 4,062,247 | 12/1977 | Brown et al. | 74/89 |
| 4,684,249 | 8/1987 | Ellis | 356/152 |
| 4,909,459 | 3/1990 | Patterson . | |
| 4,923,147 | 5/1990 | Adams et al. | 244/122 AG |
| 4,954,815 | 9/1990 | Delmonte | 340/686 |
| 4,967,985 | 11/1990 | Deakin | 244/122 |

FOREIGN PATENT DOCUMENTS

| | | |
|---|---|---|
| 0361369 | 4/1990 | European Pat. Off. . |
| 8801968 | 3/1988 | PCT Int'l Appl. . |
| 2163943 | 3/1986 | United Kingdom . |

*Primary Examiner*—Bentsu Ro
*Attorney, Agent, or Firm*—Larson and Taylor

[57] ABSTRACT

A head equipment comprises a component such as a helmet connectable to the head of a wearer and movable by the wearer in a limited field, with at least five degrees of freedom. It comprises an arm constituted by articulated segments giving the component at least five degrees of freedom with respect to the fixed structure and linking the component to a fixed structure.

5 Claims, 3 Drawing Sheets

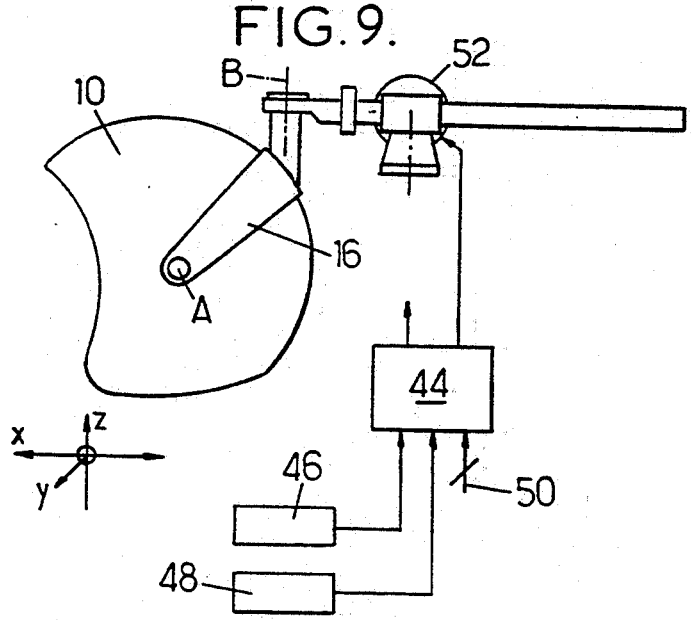
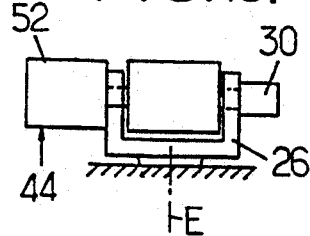
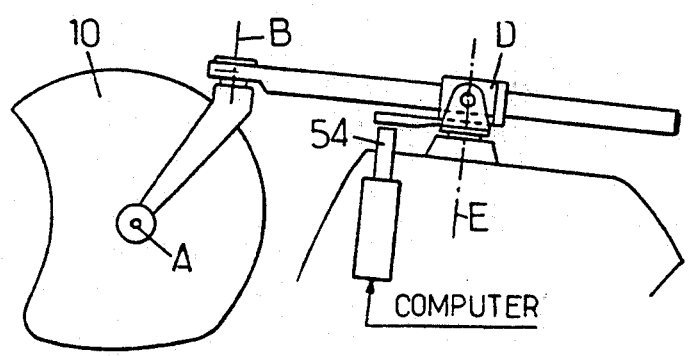
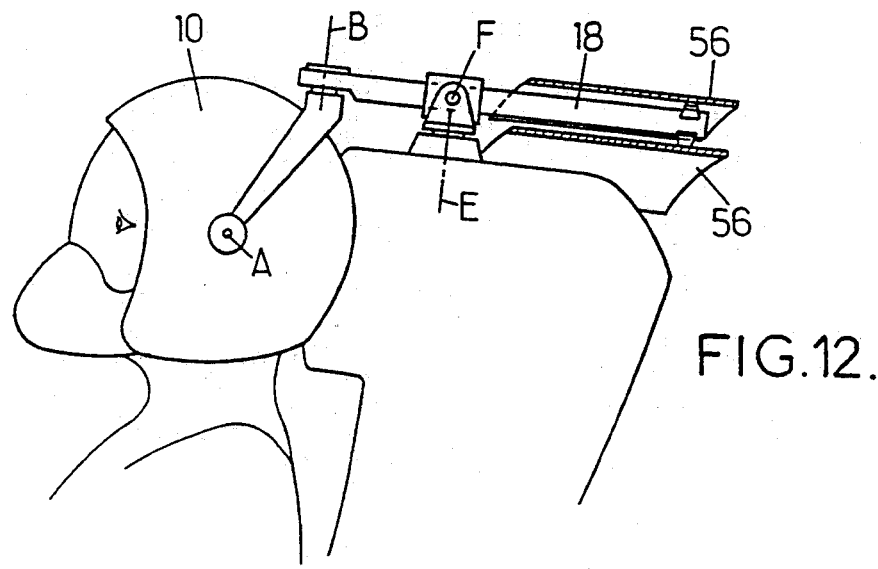

HEAD EQUIPMENT WITH ARTICULATED ARM

The present invention relates to head equipments or gears of the type comprising a component, such as a helmet, connectable to the head of a wearer and movable by the wearer in a limited field with at least five degrees of freedom (from among the three spatial directions as well as in elevation, in bearing and in roll).

It is particularly suitable for use in fighter aircraft. On these aircraft, the pilot is subjected, during harsh manoeuvres and during ejections to very high accelerations in the course of which it is desirable that the head be held. Moreover, the current trend is to provide the helmet with a visor which generates a graticule or aiming mark in the field of view of the pilot. Sensors make it possible for a computer to determine the position and the orientation of the helmet. At the present time, the sensors are generally electromagnetic and comprise coils placed in the cockpit along three orthogonal directions and a set of three orthogonal coils on the helmet. Tills mode of measurement is far from being satisfactory as it requires knowledge of the magnetic cartography of the cockpit, which changes with time. Moreover, the precision of the elecromagnetic sensors is insufficient.

It is an object of the invention to provide an improved head equipment of the type defined above. It is a more specific object to provide an equipment which makes it possible to determine with accuracy the position and the orientation of the component which is connectable to the head and/or makes it possible to cancel out or at least to reduce the forces which are exerted on the head under high load factors, and to do so by employing only simple means.

With this purpose in mind, there is provided a head equipment which comprises an arm constituted by articulated segments giving the component at least five degrees of freedom with respect to the fixed structure.

In the preceding definition, the term "articulation" must be interpreted widely. It will above all designate a link between two segments making it possible for these segments to turn with respect to one another around a connecting axis, It can however equally designate a translational articulation, taking the place of only some of the articulations in rotation in order to arrive at five degrees of freedom at least.

The arm and the means cooperating with it can be provided in order to fulfil any one of several functions or simultaneously several of them.

Among the functions can especially be mentioned:
measurement of the position and of the orientation of the head equipment with respect to the structure;
support of the head equipment when it tends to movo under the influence of acceleration which are judged too violent, in order to relieve the wearer of the equipment;
balancing of masses, at least around certain axes;
compensation of the effects of accelerations.

In the first case each articulation between segments is equipped with means of measurement of relative orientation or of relative displacement in translation of the two successive segments.

At the present moment there are angular resolvers which make it possible to measure an angle with a precision ranging from ten seconds to one minute: such resolvers make it possible to measure the orientation of the component, that ia to say the essential parameter for a helmet visor, with a precision better than a millimedian, while the current visors provide only a precision of the order of ten milliradians.

Compensation for masses and/or for accelerations is of very particular interest when the wearer is an aircraft or helicopter pilots or driver of a tank or of a rough-terrain vehicle, the server of a turret or more generally any person subjected to violent accelerations and/or who is equipped with a heavy head equipment or with a significant encumbrance. The fixed structure is generally constituted by the wearer's seat, which can be the ejection seat of an aircraft.

Compensation for masses can especially be obtained by equipping certain at least of the segments with balancing counterpoises. For example the balancing by counterpoises of the helmet and of elements which it carries (night vision goggles, light amplifier, visor, etc.) can be produced by counterpoises and consequently can substantially reduce the fatigue of the wearer. The presence of a stop, possibly with some play, for at least certain of the segments also makes it possible to compensate for the weight of the masses of the component fixed to the head.

Such means of balancing and of compensation can be considered as passive. It is also possible to effect active compensation of the effects of accelerations. To do this, at least certain of the articulations can be equipped with motor means controlled in response to the value and the orientation of the accelerations applied to the wearer in order to compensate for the forces set up by these accelerations.

The motor means are generally torque motors controlled by a computer receiving input signals representing the accelerations, supplied by sensors and possibly signals representing the position of the head.

In one particular embodiment, applicable especially on an aircraft, the arm can be regarded as constituted by two joints placed in series and each supplying three degrees of freedom in rotation along three orthogonal axes. Another solution consists in reducing the number of degrees of freedom in rotation and in adding one degree of freedom in translation. An angular or linear displacement sensor is provided for each degree of freedom.

Some segments of the arm can be equipped with resilient elements or with counterpoises which make it possible to compensate for the mass of the component which is rigidly fixed to the head, of the head itself and/or of the segments, while others are actively controlled by torque motors controlled in response to the accelerations, measured by sensors, and to the position indications obtained from the displacement sensors.

In the case of mounting on an ejection seat, the arm is supplemented by a flexible strap for return of the head against the seat before ejection.

One of the articulations of the arm can comprise a link which can easily be fixed and removed, for example by clipping to the helmet of a pilot, in order to make it possible for the latter to climb in. This link or another link can be detachable at a defined altitude to free the pilot from his seat when the pi lot is placed on an ejection seat.

The invention will be better understood on reading the description which follows of particular embodiments, given by way of non-limiting examples, The description refers to the drawings which accompany it, in which.

Figure 1:
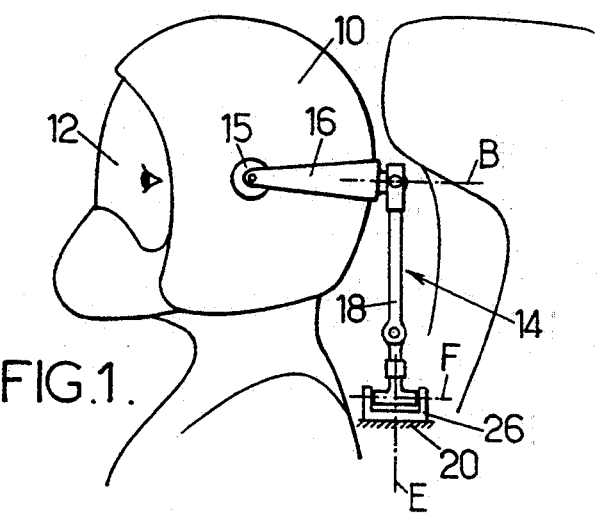
FIG. 1 is a basic diagram in elevation showing an equipment comprising an arm allowing six degrees of freedom.
Figure 6:
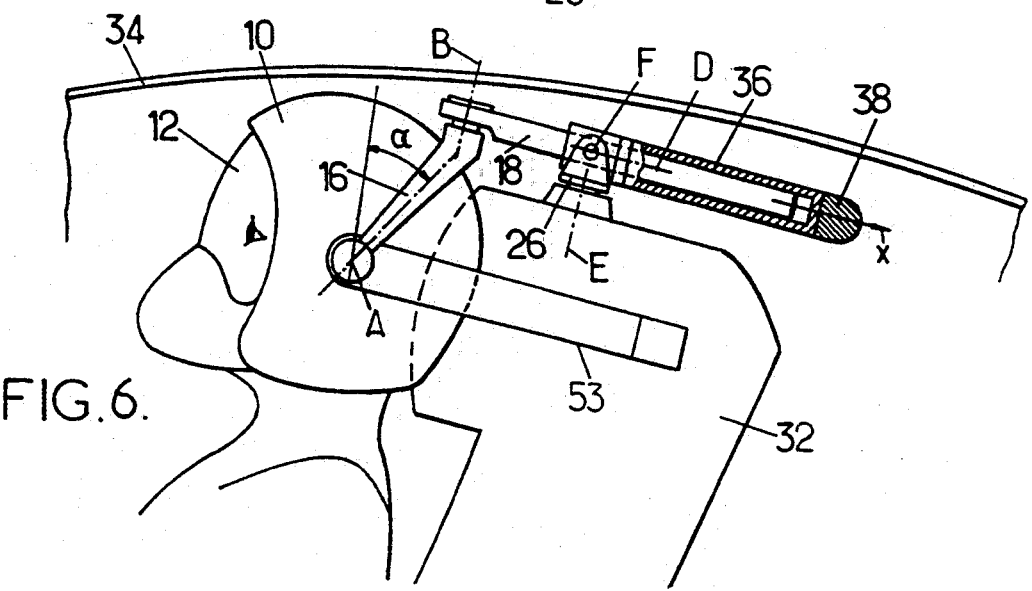
Figure 4:
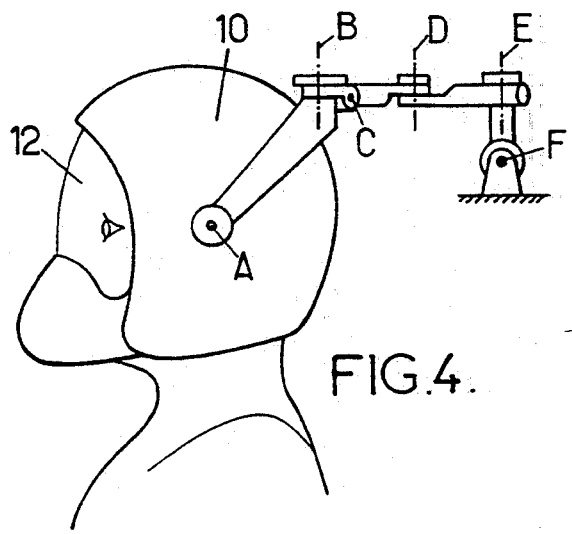
Figure 5:
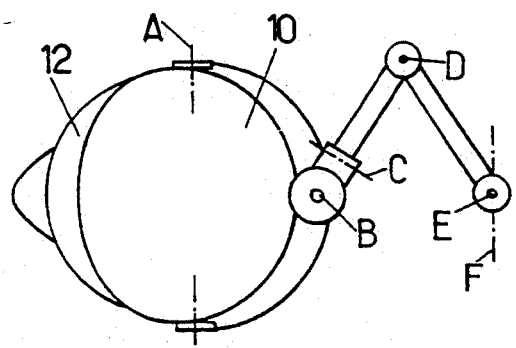
Figure 7:
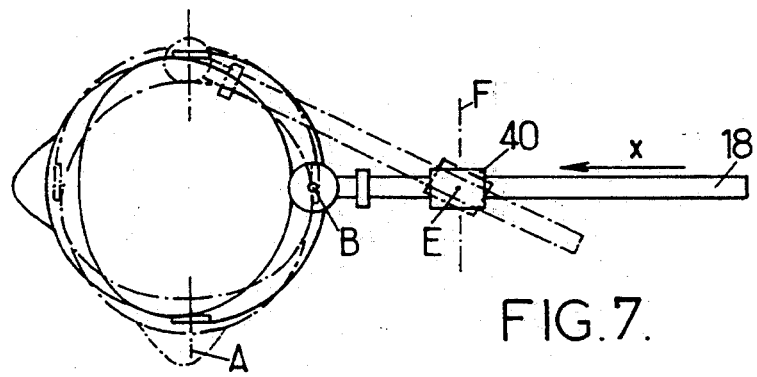
Figure 8:
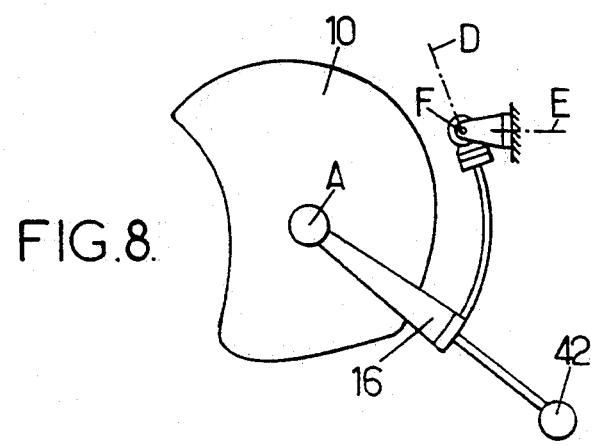

FIG. 4, similar to FIG. 1, shows a variant of the arm;

FIG. 5 is a view from above showing the kinematics of the arm of FIG. 4 when the component has turned by ninety degrees with respect to its middle position;

FIG. 6, similar to FIG. 1, shows yet another variant, with a counterpoise for vertical and transverse balancing;

FIG. 7 is a view from above showing an equipment similar to that of FIG. 6, in solid lines, in a middle position and in dot-dash lines when the head component has turned by 90°;

FIG. 8 shows an arm making it possible to balance the accelerations around two axes (vertical axis and transverse axis);

FIGS. 9 and 10 are detail views showing a torque motor controlling one of the articulations of an arm similar to that of FIG. 7, FIG. 11 is a diagram in elevation showing an equipment comprising an arm allowing six degrees of freedom and equipped with an adjustable stop for limitation of the forces and the displacements in the direction of the aircraft vertical (axis z);

FIG. 12, similar to FIG. 11, shows an equipment incorporating guide ways absorbing, at least partially, the forces directed in the direction of the aircraft vertical, A head equipment will first be described which makes it possible to determine the orientation of the helmet of a pilot and also the position of this helmet with respect to a fixed structure.

In this case the arm linking the helmet to the structure does not carry significant forces and can thus be constituted by elements of reduced cross-section.

Figure 2:
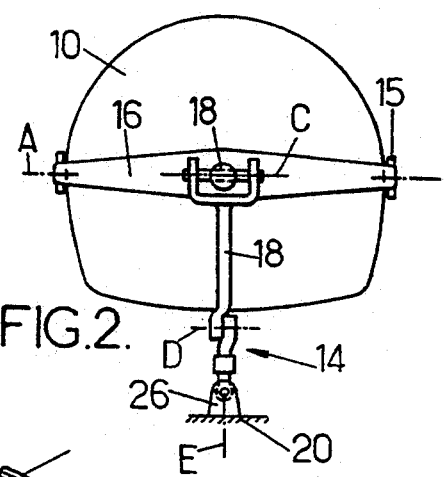
FIGS. 2 and 3 are respectively a rear view of the equipment and a view in perspective of the arm.

The component of the head equipment shown in FIGS. 1 and 2 is constituted by a helmet 10 intended to be fixed on the head 12 of a pilot and capable of being equipped with a helmet visor which is not shown. The arm 14 shown by way of example in FIGS. 1 to 3 has six degrees of freedom in rotation and consequently makes it possible for the wearer of the helmet to give the latter any position and orientation whatever in a limited field of clearance. These six degrees of freedom are designated by the references A, B, . . . , F.

The arm can be regarded as constituted by five successive segments. The first segment is constituted by an arc-shaped piece 16 connected to the helmet 10 by two pivots defining the axis A. The second segment 18 is constituted by a spider 18 which can be regarded as a conventional spider of a Cardan joint. It turns on the arc-shaped piece 16 by means of a bearing which is not shown, defining the axis B. It comprises two journals on which turns the terminal fork of a connecting rod 18. The axes B and C thus remain permanently orthogonal.

The connecting rod 18 is attached to the fixed structure 20 by a link comprising the fourth segment 22 and another Cardan joint formed by a spider 24 and a clevis 26 fixed to the structure. A bearing interposed between the segment 22 and the spider 24 defines the axis E. The spider 24 and the clevis 26 turn around one another along the axis F.

A rapid fastener is provided on the arm to make it possible to separate the helmet from the fixed structure, For example this rapid attachment can be placed at the level of the articulation constituting the axis B. It can also link the arc-shaped piece 16 to the helmet and comprise two clips 15.

Figure 3:
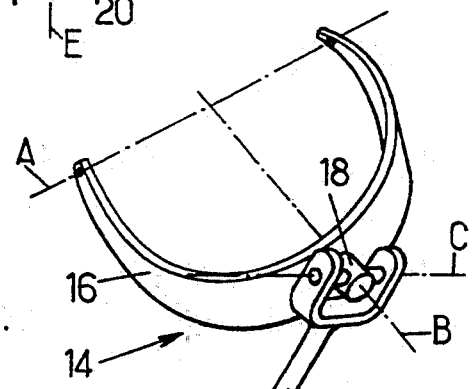

The angle, around each of the axes, of the two segments linked along the axis can be measured by a sensor, such as an angular resolver, and the representative signal can be supplied to a computer 28 supplying at its output Indications representing the position and the orientation of the helmet, and possibly of a visor which is fixed to it, in a coordinate system linked to the fixed structure, and thus to the cockpit in the case of an aircraft. FIG. 3 shows, by way of example, a single sensor 30, supplying an orientation signal around the axis F to the computer 28.

The variant shown in FIGS. 4 and 5 differs from the preceding one essentially in that the axes B, D and E are parallel when the helmet is in middle position and in that the articulation D is placed half way between the articulations B and E, in such a way as to constitute scissors allowing rotation of the head 12 and of the helmet 10 around the yaw axis of the vehicle.

Here again, each of the articulations can be equipped with an angle sensor, such as a resolver supplying an electrical signal representing the angle of the two successive segments to a computer which is not shown.

The embodiment shown in FIG. 6 comprises passive means of balancing. It is of interest every time the masses fastened to the head of the wearer are high and constitute a source of fatigue, even in the absence of high acceleration. This case can be encountered on any military vehicle. Balancing particularly makes it possible to directly fix a heavy component, such as night vision goggles, onto the helmet instead of placing them at a fixed position in a cockpit. FIG. 6 shows, by way of example, an equipment which is usable in an aircraft for a pilot placed on a seat 32 constituting the fixed structure and under a canopy 34. The angle $\alpha$ between the arc-shaped piece 16 and the direction of the head and shoulders is given a value which is the minimum compatible with correct upwards vision and with the obstruction of the canopy. The axis B is, at rest, practically parallel to the direction of the head and shoulders. The third degree of freedom is, in the case of FIG. 6, constituted by a possibility for sliding along a direction x which is orthogonal to the axis B. For that reason the connecting rod 18 constitutes a plunger capable of sliding and turning in a cylinder 36. This cylinder is in turn mounted on the back of the seat, forming the fixed structure 32, by a Cardan joint having a clevis 26 in which are mounted journals fixed to the cylinder. A linear sensor 37 can in this case be provided in order to indicate the position of the plunger in the cylinder 36.

This solution has the advantage of permitting a purely or partially passive balancing, by adding of the counterpoise 38 at the end of the cylinder 36; if the angle $\alpha$ is small, the compensation for the masses and the forces due to the accelerations remains partially in being despite movements of the head.

As in the preceding case, each of the articulations can be equipped with a position sensor. These sensors are angular resolvers for pivoting articulations. The sensor is linear for the third degree of freedom.

FIG. 7 shows a simplified variant of the embodiment of FIG. 6, without the cylinder. The connecting rod 18 then simply slides in a bore in a sleeve 40.

In the case of FIG. 8, where certain axes are not shown for extra clarity, the partial balancing is produced with the aid of a counterpoise 42 carried by a stalk fixed to the arc-shaped 16, of a length such that the balancing is almost entirely produced with respect to the placing of the axes D and F which do not move much. The weight components in the vertical direction are thus brought into balance.

The embodiment shown in FIG. 9 and 10 differs from that of FIG. 7 essentially in that it comprises active means of compensation for the effect of acceleration. For this purpose, certain at least of the articulations are equipped with torque motors supplied under the control of a computer 44 whose inputs receive signals representing accelerations along at least the aircraft vertical and advantageously in the transverse direction, that is to say along the direction of the pitch axis and by output signals from the position sensors. This computer 44 determines, on the basis of the signals supplied by the acceleration sensors 46 and 48, taking account of the signals 50 representing the position of the helmet, the torques which the motors have to exert.

The equipment shown schematically in FIGS. 9 and 10 comprises only one motor 52 intended to compensate for the inertial forces exerted on the head and the helmet during pullout from a dive, a tight turn, or even a negative acceleration.

The equipment can be supplemented by means bringing the helmet back against the back of the seat and holding the helmet firmly in place in the case of an ejection command and by means for automatically separating the rod assembly in two sections at the altitude of separation of the seat and the occupant, in the case of ejection.

As indicated above, simplified equipments offering only five degrees of freedom are sufficient in certain cases. For example, the embodiment shown in FIG. 6 can have the possibilities of rotation around the axis F removed, which means that the rod assembly 18 always remains substantially horizontal. The equipment can comprise means of measurement only, means of balancing only, means of active compensation only or any combination.

In the embodiment shown in FIG. 11, the forces exerted on the head in the case of vertical downwards acceleration are absorbed by a movable stop 54 whose position is set by a computer 44. This stop limits the vertical displacements of the head from the position which it occupies when the acceleration is applied.

In the case of FIG. 12, the forces due to the head equipment's own weight, possibly including the arm, and to the accelerations are absorbed in the vertical direction by the support of sliders fixed to the rod assembly 18 on ramps 56 constituted by skewed surfaces which are sufficiently long to permit normal freedom of movement for the head in the space judged necessary.

The arm of the equipment can, in any case, serve as a support or a linking passage ducting of any type, especially by electrical wires, optical fibres or pneumatic ductings. The head equipment can be supplemented by members such as a head up display, night vision goggles, etc.

It must be understood that the range of the present patent extends to all variants remaining within the scope of equivalences.

I claim:

1. Head equipment comprising a component fastenable to the head of a wearer for movement by the wearer with respect to a fixed structure in a limited field, with at least five degrees of freedom, an arm having a plurality of mutually articulated segments giving the component at least five degrees of freedom with respect to the fixed structure and linking the component to the structure, wherein at least certain of the articulations between segments are provided with motor means controlled in response to the value and to the orientation of accelerations applied to the wearer in order to compensate for the forces set up by these accelerations.

2. Equipment according to claim 1, further comprising a computer controlling the motor means and programmed to take into account the position and the orientation of the head equipment.

3. Head equipment comprising a component fastenable to the head of a wearer for movement by the wearer with respect to a fixed structure in a limited field, with at least five degrees of freedom, an arm having a plurality of mutually articulated segments giving the component at least five degrees of freedom with respect to the fixed structure and linking the component to the structure, wherein at least certain of the segments are provided with counterweights for compensation of gravity forces and inertia forces due to said component along at least certain of the degrees of freedom.

4. Equipment according to claim 3, further comprising slidable means for guidance or limitation of the amount of movement along only certain of the degrees of freedom.

5. Head equipment comprising a component fastenable to the head of a wearer for movement by the wearer with respect to a fixed structure in a limited field, with at least five degrees of freedom, an arm having a plurality of mutually articulated segments giving the component at least five degrees of freedom with respect to the fixed structure and linking the component to the structure, means of measurement of an amount of movement for each degree of freedom, a computer, and a means for determination of angular position and location of the component with respect to the structure, wherein at least some of the segments carry counterpoises for compensation of gravity forces and inertia forces along at least certain of the degrees of freedom.

* * * * *